March 27, 1962 H. TAUL ET AL 3,027,355
APPARATUS AND METHOD FOR THE CONTINUOUS
PRODUCTION OF POLYAMIDES
Filed March 20, 1958
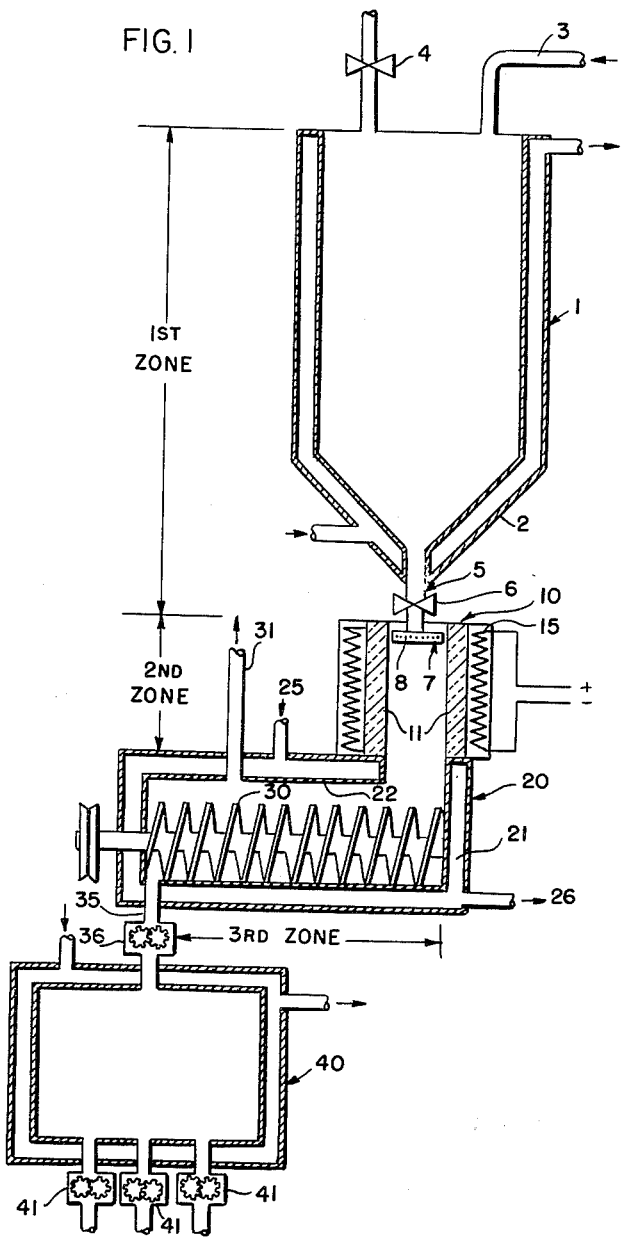
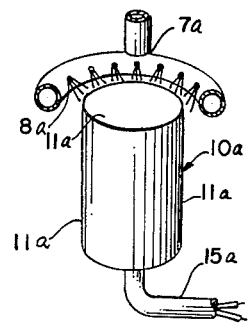
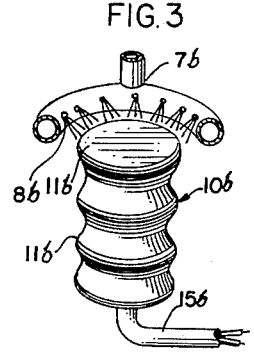
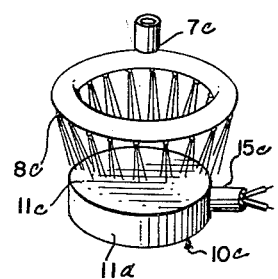
INVENTORS:
HORST TAUL
FRITZ WILOTH
BY *Marzall, Johnston,
Cook & Root*
ATT'YS

United States Patent Office 3,027,355
Patented Mar. 27, 1962

3,027,355
APPARATUS AND METHOD FOR THE CONTINUOUS PRODUCTION OF POLYAMIDES
Horst Taul, Obernburg (Main), and Fritz Wiloth, Klingenberg (Main), Germany, assignors to Vereinigte Glanzstoff-Fabriken A.G., Wuppertal-Elberfeld, Germany
Filed Mar. 20, 1958, Ser. No. 722,736
Claims priority, application Germany Apr. 6, 1957
5 Claims. (Cl. 260—78)

This invention relates to an apparatus and method for the continuous production of polyamides from aqueous dispersions of their precursor dicarboxylic acid-diamine salts.

In the process for the manufacture of polyamides, it is generally known to carry forward the initial stages of the condensation in aqueous environment under relatively high pressure. After substantially all of the water has been removed, for example, not more than about 15% by weight of the reaction mass constitutes water, the high pressure of operation is reduced to atmospheric pressure. The basic problem in the polyamide condensation processes heretofore practiced is in the continuous transfer of the condensate heated to the polyamide-forming temperatures and under pressure to the pressureless stage, or the stage wherein the condensate is kept under vacuum. The problem comes about when the pressure is released suddenly, the water present flashes off, and the heat of evaporation of the water in conjunction with a sudden drop in pressure produces such a marked cooling effect upon the fusion mass that it solidifies. Thereafter it is difficult to re-establish flow of the fusion mass through the necessary additional periods at elevated temperature and normal to sub-atmospheric pressures essential to the polymerization of the polyamide to the molecular weight essential in the manufacture of commercially valuable products.

If one attempts to reheat the thus cooled fusion mass, which is in a solid state, the relatively poor heat conductivity of the polyamide and the limited amount polymer surface available for heat transfer creates a technological problem in heating the mass uniformly to the point that the mass becomes sufficiently mobile to be physically transferred through processing equipment and to be heated uniformly throughout its mass. It is general that decomposition occurs between the heat transfer surfaces of the equipment and the polycondensate in immediate contact therewith.

The prior art has attempted to overcome these difficulties by a variety of proposals. One of the attempted solutions provides a plurality of stages of pressure release during the fusion, in which arrangement a gradual pressure drop occurs without excessive heat loss. In another proposal, pressure release over the fusion is designed to take place in a conduit of gradually increasing dimension in which a gradual pressure drop occurs. Other practices are known wherein the residual water in the fusion is removed through ancillary benzene vapors conducted into and through the fusion mass while it is under pressure. The benzene vapors presumably assist in preventing solidification of the fusion upon pressure release. The proposed prior art processes are complicated both in the nature of the apparatus necessary and the method or procedure of operation. In one method of prior art operations, fusion of the polyamine salts to polyamides is conducted through extremely long heated tubes which favor local cracking of the condensate and deposition of cokelike material in the heat transfer surfaces interfering seriously with heat transfer.

It is a first object of this invention to provide a process for the continuous production of polyamides from aqueous dispersions of their precursor dicarboxylic acid-diamine salts.

The first state of the process is analogous to that of the prior art in that the quantity of water accompanying the dicarboxylic acid-diamine salts is reduced by evaporating the water therefrom as steam under super-atmospheric pressures and temperatures above the boiling point of water at those pressures, but not above about 275° C. The initial processing is carried forward until the water content of the condensing fusion mass is not greater than about 15% by weight thereof and preferably of the order of 5% to 10%. When this condition of the fusion mass has been reached, the forming polyamide is expelled from the high pressure of the first reaction zone to a second zone which is held at atmospheric pressure or below through a hollow ring leading from the first zone to the second zone, the ring having a plurality of nozzles directed to force impingement of the dicarboxylic acid-diamine condensate in particulate form against an extensive heated metal surface area, preferably heated by electrical means, and the metal of its formation particularly selected for its high heat conductivity. There are several alternative forms of apparatus useful in the heat transfer and pressure drop which may be employed and these will be discussed in connection with the description of the apparatus. The temperature of the metal surface area is held within a range of from about 230° C. to 350° C. as the fusion mass is directed from the zone of high pressure to that held at atmospheric pressure and below. Thus, while the condensing mass loses heat due to the expansion and rapid volatilization of residual water therein, the high heat transfer coefficient (the quantity of heat in gram calories, transmitted per second through a plate of the material one centimeter thick and one square centimeter in area when the temperature difference between the two sides of the plate is 1° C.—the coefficient ($\lambda$) is often called the heat conductivity coefficient) of the metal upon which the fusion is impinged as well as the high heat capacity of the heating unit itself provides high energy input into the fusion mass so that every little change in temperature occurs with the marked change in pressure. Thereafter the fusion mass, under reduced pressure, flows over the surface of the heating unit upon which it has impinged and is thereafter advanced in a particulate form at atmospheric pressure and below by means of a worm or ribbon-type helical unit through a subsequent processing zone having a residence time therein of the order of from 30 to 60 minutes, a temperature range of approximately 260° C. to 300° C. or more, as is essential to advance polymerization of the polyamide to the desired molecular weight.

An additional object of this invention is to provide an apparatus particularly suited for carrying out the foregoing process and which is described below in greater detail.

FIGURE 1 is a vertical cross-section through one modification of the apparatus.

FIGURE 2 is an alternative form of the heat exchange element, partly in section.

FIGURE 3 is another modification in form of the heat exchange element, partly in section.

FIGURE 4 is still another modification in the arrangement of the heat exchanger.

Referring more particularly to FIG. 1, a receiving vessel 1 operable at super-atmospheric pressure and provided with a jacket 2 adapted to receive a heat transfer liquid, illustratively, diphenyl, encompasses the receiving vessel. A pressure release valve 4 at the top of vessel 1 provides a vent for steam released from the condensation reaction at a pre-set pressure level. Aqueous dispersions of the dicarboxylic acid-diamine salts may be pumped or otherwise forced into the reaction vessel 1 through the entry tube 3. Pressure within the vessel may be controlled by means of the pressure relief valve 4 setting and by means of ancillary pumping equipment operating upon the content of the vessel 1 through entry tube 3. The base of vessel 1 is provided with an egress means 5 controlled by means of valve 6 which feeds into a conduit leading to ring nozzle 7. A plurality of nozzles 8 are provided in ring nozzle 7, the direction of the nozzles is determined by the particular modification of the heat exchanger selected as observed in FIGURES 2, 3 and 4 where various modifications are illustrated.

In the modification shown in FIG. 1, the heat exchanger 10 is a hollow cylinder preferably formed of aluminum which has been silver-plated about its inside periphery 11. The plurality of nozzles 8 about the periphery of hollow ring nozzle 7 are so directed as to cause a plurality of individual particulate streams flowing therefrom to impinge on the silver-plated inner wall 11 of hollow cylinder 10 provided with electrical resistance heating means 15 controlled by a rheostat (not shown).

In the modification of the heat exchanger shown in FIG. 2, the electrical heating element 15a is within solid cylinder 10a again preferably made of aluminum having the exterior periphery 11a thereof silver-plated. The hollow ring nozzle 7a is adapted to fit in concentric relation about, but at a spaced relation from, the exterior walls of cylinder 10a. The nozzles 8a are adapted to direct effluent streams of individual particulate material from the high pressure vessel 1 to atmospheric pressure by impingement of the particulate streams against the exterior peripheral walls 11a of heated cylinder 10a.

The modification in FIG. 3 illustrates an increased surface area 11b of a modified cylinder 10b, but is otherwise similar to FIG. 2. Obviously other irregularities of surface will increase the surface area.

In the modification shown in FIG. 4, a simple plate 10c, analogous to cylinder 10b of FIG. 3 is illustrated. The plate 10c has imbedded within it an electrical heating element 15c which may be rheostat controlled as described. In FIG. 3 modification the nozzles 8c of ring 7c are directed so that the effluent streams impinge upon the top surface 11c of the plate 10c and flows therefrom downwardly and about vertical surfaces 11d into a subsequent zone of treatment.

In the modification of FIG. 3, the primary change is merely to demonstrate means whereby the heating surface presented to the impinging streams of effluent material may be increased in surface area by alteration of the surface of the heated unit. This surface may be varied by use of ribs, needles or other similar projections whose primary function is that of increasing the surface area of the form to increase the area of heat transfer.

The nature of the material used to produce the heat exchanger unit 10, 10a, 10b or 10c is particularly critical. A type of steel available in Germany known as V4A, presumed to be a non-corrodible alloy metal, has a heat transfer coefficient of 0.035. This material is not useful for fabricating the heat exchanger wall as the heat transfer coefficient is not sufficiently good. The usable metals include silver, having a heat transfer coefficient of 1.0; copper, having a heat transfer coefficient of 0.94; and aluminum, having a heat transfer coefficient of 0.55. Of these metals, aluminum is preferred in that it has a high specific heat or is capable of accumulating a considerable quantity of heat and transferring energy so stored in it at a rapid rate. Because of the high order of chemical reactivity of aluminum, however, in the preferred practice of this invention the aluminum surface, to be exposed to direct contact with the dicarboxylic acid-diamine fusion mass, is coated with a thin layer of silver which is more resistant to chemical attack. Other metals having a heat transfer coefficient in excess of 0.5 are useful for the purpose of construction of the heat transfer unit.

Following reduction in pressure over the fusion mass as residual quantities of water are expelled and the temperature thereof maintained by means of heat exchanger 15, the fusion mass is transferred from the second zone to and through a third zone defined by jacketed vessel 20, in which jacket 21 provides heat exchanger walls 22. Means are provided for ingress 25 and egress 26 of heat exchange fluid which may be at the same or different temperature than that in the other zones of processing within the total apparatus. A helical ribbon mixer or worm 30 operating within the third zone 20 provides means for controlling the resident time of the fusion so that the requisite degree of polymerization can be achieved. Normally, the residence time is of the order of 30 to 60 minutes and the temperature maintained within the third zone of reaction 20 is of the order of 260° C. to 300° C., more or less. Obviously, other means for forwarding the fusion through the third zone of reaction 20 may be provided. The pressure within chamber 20 is controlled at atmospheric pressures or below by means of vent or vacuum through exit tube 31.

Subsequent to polyamide formation, the polyamide may be removed from vessel 20 through outlet 35 by means of gear pump 36 which may provide pressure control means within vessel 20. In a preferred modification of the invention, gear pump 36 feeds the formed polyamide directly to a heat exchanger 40 from which the polyamide is forced by gear pumps 41 through spinnerettes on the discharge side thereof into the desired end form.

It is obvious that the apparatus may be modified in many of its aspects over that specifically described, and that the conditions of processing will be varied somewhat depending upon the nature of the dicarboxylic acid-diamine selection as well as the end molecular weight of the product polyamide and the amount of water originally present in the precursor polyamine salt.

The following example is specifically illustrative of the process.

*Example 1*

Apparatus as shown in the drawings is supplied with an aqueous suspension containing about 40% water of a dicarboxylic acid-diamine salt (adipic acid-hexamethylene diamine salt) at 18 atmospheres pressure and a temperature of 260° C. Steam formed escapes through a pressure release valve and the processing is continued to a water content of 5% to 10% and a temperature not to exceed 275° C.

The condensate polymer forming is continuously discharged through nozzles and impinges against the silver-plated interior periphery of a hollow aluminum cylinder held at a temperature of 270° C. to 300° C. as the pressure is reduced from super-atmospheric to atmospheric pressure. Relatively close to adiabatic conditions in the condensate during the pressure change are thus maintained. This heater is preferably electrically controlled whereas the other jacketed vessels in the process are conveniently heated by diphenyl circulated through the jackets of the process vessels.

Upon release of pressure, water vapor flashes off and a foamlike solids product flows downward over the heated surfaces into a third zone processing vessel, also heated, but which is maintained at atmospheric pressure, or below if desired. A screw feed advances the polymer in particulate form through the third zone processing vessel during a residence time of 50 minutes (30 to 60 minutes provides a general time range) at a temperature of 275° C. (260–300° C. provides a useful range of temperature) at a rate of 450 grams/minute (400 to 500 grams/minute have been possible in a specific apparatus).

Thereafter, the fusion mass is expelled from the third zone of reaction into standard processes and standard processing equipment.

Having thus described our improvement in the processing of polyamides and an apparatus suitable to the process, we claim:

1. Process for the continuous production of polyamides from aqueous dispersions of their precursor dicarboxylic acid-diamine salts which comprises evaporating water as steam from said aqueous salts under super-atmospheric pressure at a temperature not above about 275° C. to a water content not greater than about 15% by weight thereof in a first zone and reducing the pressure to at least atmospheric pressure in a second zone by impingement of the condensate in particulate form against and over a heated metal surface area held at a temperature of about 230° C. to 350° C., said metal being selected from the group consisting of silver, copper, and aluminum.

2. Process for the continuous production of polyamides from aqueous dispersions of their precursor dicarboxylic acid-diamine salts which comprises evaporating water as steam from said aqueous salts under super-atmospheric pressure at a temperature not above about 275° C. to a water content in the range of from about 5% to about 10% by weight thereof in a first zone and reducing the pressure to at least atmospheric pressure in a second zone by impingement of the condensate in particulate form against and over a heated metal surface area held at a temperature of about 230° C. to 350° C., said metal being selected from the group consisting of silver, copper, and aluminum.

3. Process for the continuous production of polyamides from aqueous dispersions of their precursor dicarboxylic acid-diamine salts which comprises evaporating water as steam from said aqueous salts under super-atmospheric pressure at a temperature not above about 275° C. to a water content in the range of from about 5% to about 10% by weight thereof in a first zone, impinging the condensate in particulate form against and over a heated metal surface held at a temperature of about 230° C. to 350° C. within a zone of atmospheric or lower pressure, said metal being selected from the group consisting of silver, copper, and aluminum, advancing the particulate material at a pressure not above atmospheric slowly through a third zone during a residence time of from 30 to 60 minutes within a temperature range of from about 260° C. to about 300° C. and recovering the polyamide polymer thus formed.

4. An improvement in a process for the continuous production of polyamides from aqueous dispersions of their precursor dicarboxylic acid-diamine salts wherein said polyamides are demoisturized in a high pressure zone down to a moisture content of less than about 15% which comprises: expelling said forming polyamides from said high pressure zone through a plurality of nozzles onto a metal surface heated to a temperature of between about 230° C. and 350° C. placed within a second zone, said second zone having a pressure no greater than atmospheric, said metal being selected from the group consisting of silver, copper, and aluminum.

5. A process for the continuous production of polyamides from aqueous dispersions of their precursor dicarboxylic acid-diamine salts which comprises: evaporating water from said aqueous salts under superatmospheric pressure at a temperature not above about 275° C. whereby the water content of said polyamides is in the range of from about 5% to about 10% by weight thereof; expelling said polyamides from the zone of superatmospheric pressure through a plurality of nozzles onto a metal surface heated to a temperature of between about 230° C. and 350° C. placed within a second zone, the pressure within said second zone being no greater than atmospheric, said metal surface being selected from the group consisting of silver, copper, and aluminum; advancing the polyamide-forming material slowly through a third zone during a residence time of 30 to 60 minutes within a temperature range of from about 260° C. to about 300° C.; and recovering the polyamide polymer thus formed.

References Cited in the file of this patent

UNITED STATES PATENTS 2,908,666     Notarbartolo _____ Oct. 13, 1959

FOREIGN PATENTS 237,400     Switzerland _____ Sept. 1, 1945
1,069,333     France _____ July 6, 1954